United States Patent
Buchschacher et al.

[19]

[11] Patent Number: 6,052,295
[45] Date of Patent: Apr. 18, 2000

[54] CASCADE OF VOLTAGE MULTIPLIERS

[75] Inventors: Pascal Buchschacher, Mussig, France; Paul S. Forshaw, Old Alresford, United Kingdom; Eckart Rzittka, Wildberg-Sulz, Germany; Marko Radovic, Zürich, Switzerland; Kurt Mühlemann, Uetikon, Switzerland; John N. Mamczak, Zürich, Switzerland

[73] Assignee: U.S. Philips Corporation, New York, N.Y.

[21] Appl. No.: 09/313,599

[22] Filed: May 18, 1999

[30] Foreign Application Priority Data

May 20, 1998 [EP] European Pat. Off. .............. 98201688

[51] Int. Cl.[7] .................................................... H02M 3/18
[52] U.S. Cl. ............................................. 363/59; 307/110
[58] Field of Search ................................... 363/59, 60, 61; 307/110

[56] References Cited

U.S. PATENT DOCUMENTS

| | | | |
|---|---|---|---|
| 3,899,689 | 8/1975 | Baker | 307/117 |
| 5,604,671 | 2/1997 | Okamura | 363/60 |
| 5,635,776 | 6/1997 | Imi | 363/60 X |

OTHER PUBLICATIONS

"On–Chip High–Voltage Generation in MNOS Integrated Circuits Using an Improved Voltage Multiplier Technique", By John F. Dickson in IEEE Journal of Solid–State Circuits, vol. SC–11, No. 3, Jun. 1976, pp. 374–378.

*Primary Examiner*—Jessica Han
*Attorney, Agent, or Firm*—Steven R. Biren

[57] ABSTRACT

A voltage converter, for converting an input voltage ($U_i$) to an output voltage ($U_o$), includes a plurality of cascaded voltage multipliers (VM1–VMN) having clock inputs, a control circuit (CNTRLG) for supplying clock signals to the clock inputs, for controlling the voltage multipliers (VM1–VMN). The control circuit (CNTRLG) includes circuitry (SL) for activating selected ones from the plurality of the voltage multipliers (VM1–VMN). The clock signals can be programmed to a part of the voltage multiplier to a non-active state. The voltage converter can, in addition, be provided with monitoring circuitry (MN) coupled between the output of the voltage converter and an input of the circuitry (SL). The monitoring means (MN) measures the output voltage ($U_o$) in order to take a decision about the required number N of active voltage multipliers (VM1–VMN).

2 Claims, 5 Drawing Sheets

CASCADE OF VOLTAGE MULTIPLIERS

BACKGROUND OF THE INVENTION

The invention relates to a voltage converter, for converting an input voltage to an output voltage, comprising a plurality of cascaded voltage multipliers having clock inputs, and a control circuit for supplying clock signals to the clock inputs, for controlling the voltage multipliers.

Such a voltage converter is known from a publication in the IEEE Journal of Solid-State Circuits, Vol. SC-11, no. 3, June 1976, pages 374–378. In said publication the output voltage of the voltage converter serves to provide high supply voltages in NMOS integrated circuits.

A drawback of the known voltage converter is that the power efficiency of the voltage converter strongly depends on the value of the output voltage with respect to the value of the input voltage. This can lead to a relatively low power efficiency of the voltage converter.

SUMMARY OF THE INVENTION

It is an object of the invention to provide an improved voltage converter which eliminates the above-mentioned drawback.

To this end, according to the invention, the voltage converter of the type defined in the opening paragraph is characterized in that the control circuit comprises means for activating selected ones from the plurality of the voltage multipliers. This makes it possible to select an appropriate number of voltage multipliers to be activated. This means that if a relatively low output voltage is desired the number of active voltage multipliers is relatively low, whereas the number of active voltage multipliers is relatively high if a relatively high output voltage is desired. Thus it can be avoided that the number of active voltage multipliers is unnecessarily high, thereby avoiding a low power efficiency of the voltage converter. The voltage multipliers which are non-active must be bypassed with switches or shunted in parallel with an active voltage multiplier. Some types of voltage multipliers allow switches within the voltage multipliers to be used also for bypassing the respective non-active voltage multipliers. If this cannot be allowed, additional bypass switches must be provided.

The voltage converter is further characterized in that at least one of the voltage multipliers is formed by a charge pump. An advantage of the use of charge pumps as voltage multipliers is that no additional bypass switches are needed, and the voltage converter can thus be relatively simple.

BRIEF DESCRIPTION OF THE DRAWINGS

The invention will be described in more detail with reference to the accompanying drawings, in which.

In these Figures parts or elements having like functions or purposes bear the same reference symbols.

DESCRIPTION OF THE PREFERRED EMBODIMENTS

Figure 1:
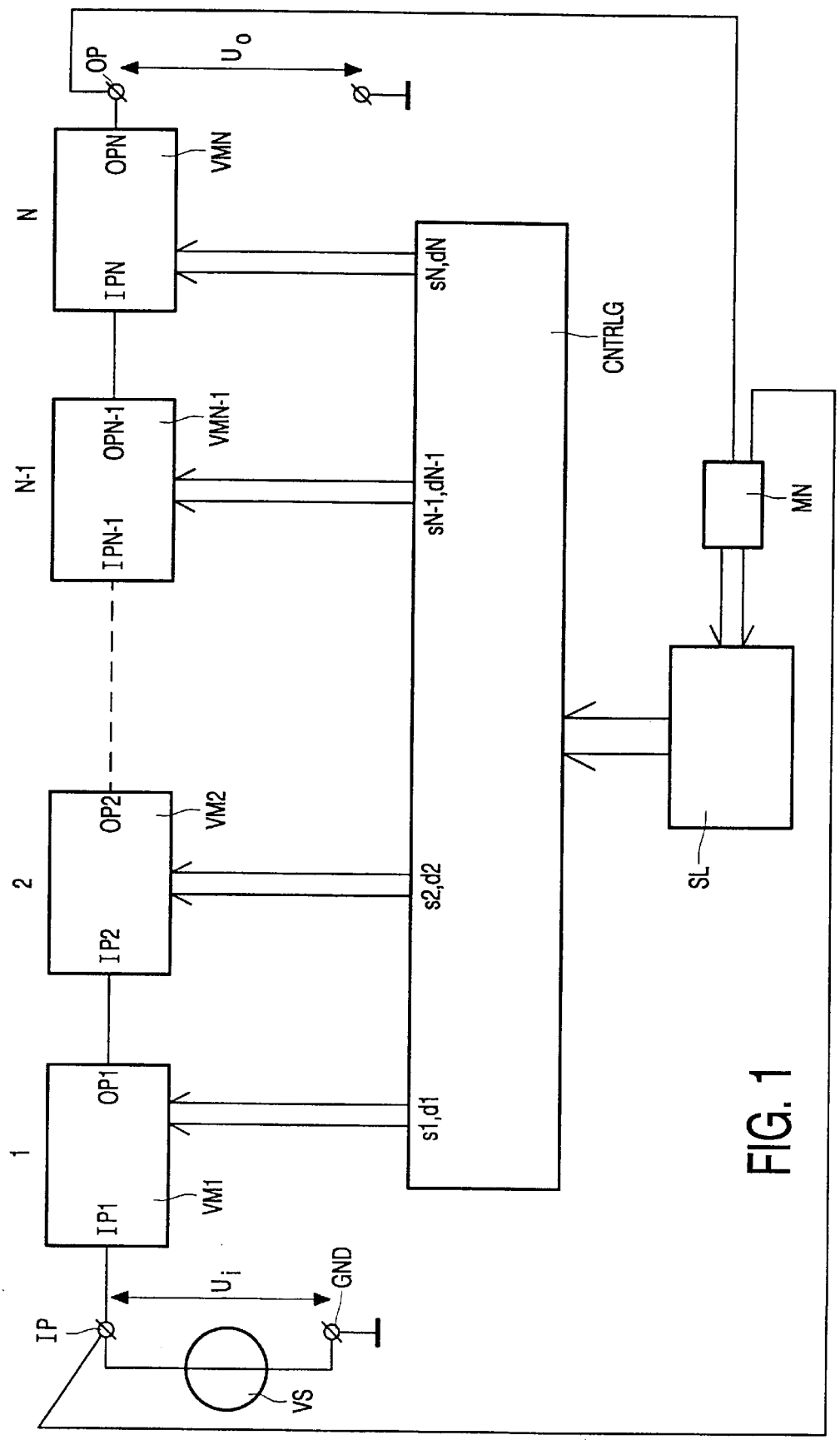
FIG. 1 is a diagram showing the principle of a voltage converter according to the invention.

FIG. 1 is a diagram illustrating the principle of a voltage converter according to the invention. The voltage converter comprises a number of N voltage multipliers VM1–VMN arranged in cascade. A first voltage multiplier VM1 is arranged to receive an input voltage $U_i$ on its input IP1. The input voltage $U_i$ is supplied by a voltage source VS between the input terminal IP and a ground terminal GND of the voltage converter. As a consequence, the first voltage multiplier VM1 delivers an intermediate voltage on its output OP1, which voltage is transferred to an input IP2 of the second voltage multiplier VM2. The second voltage multiplier VM2 in its turn delivers an intermediate voltage on its output OP2, which voltage is transferred to an input IP3 of the third voltage multiplier VM3. The same holds for all the other voltage multipliers VM1–VMN. Thus, the $N^{th}$ voltage multiplier finally delivers an output voltage $U_O$ on an output terminal OP of the voltage converter. Each voltage multiplier VM1–VMN is under control of a pair of clock input signals s1, d1–sn, dn supplied by the control circuit CNTRLG. The control circuit CNTRLG is extended by means SL for activating selected ones from the plurality of the voltage multipliers VM1–VMN. The means SL in conjunction with the control circuit CNTRLG enable all kinds of clock input signals s1, d1–sn, dn to be generated. The design of the means SL and the control circuit CNTRLG can be done in various ways and is in fact within the design-knowledge of a skilled person in the field of digital electronics. A very useful option is to (partly) implement the means SL by the use of computer software. Thus it is possible to program the desired clock input signals s1, d1–sn, dn by means of a computer. In this way, the clock input signals s1, d1–sn, dn can very easily be changed.

However, instead of programming the desired clock input signals s1, d1–sn, dn, the invention also makes it possible to automatically generate the desired clock input signals s1, d1–sn, dn. For this, monitoring means MN must be coupled between the output OP of the voltage converter and an input of the means SL, as is indicated in FIG. 1. The monitoring means MN measures the difference between the output voltage $U_O$ and the input voltage Ui in order to take a decision about the required number N of active voltage multipliers VM1–VMN.

The operation of the voltage converter will be explained in more detail in conjunction with FIGS. 2–5.

Figure 2:
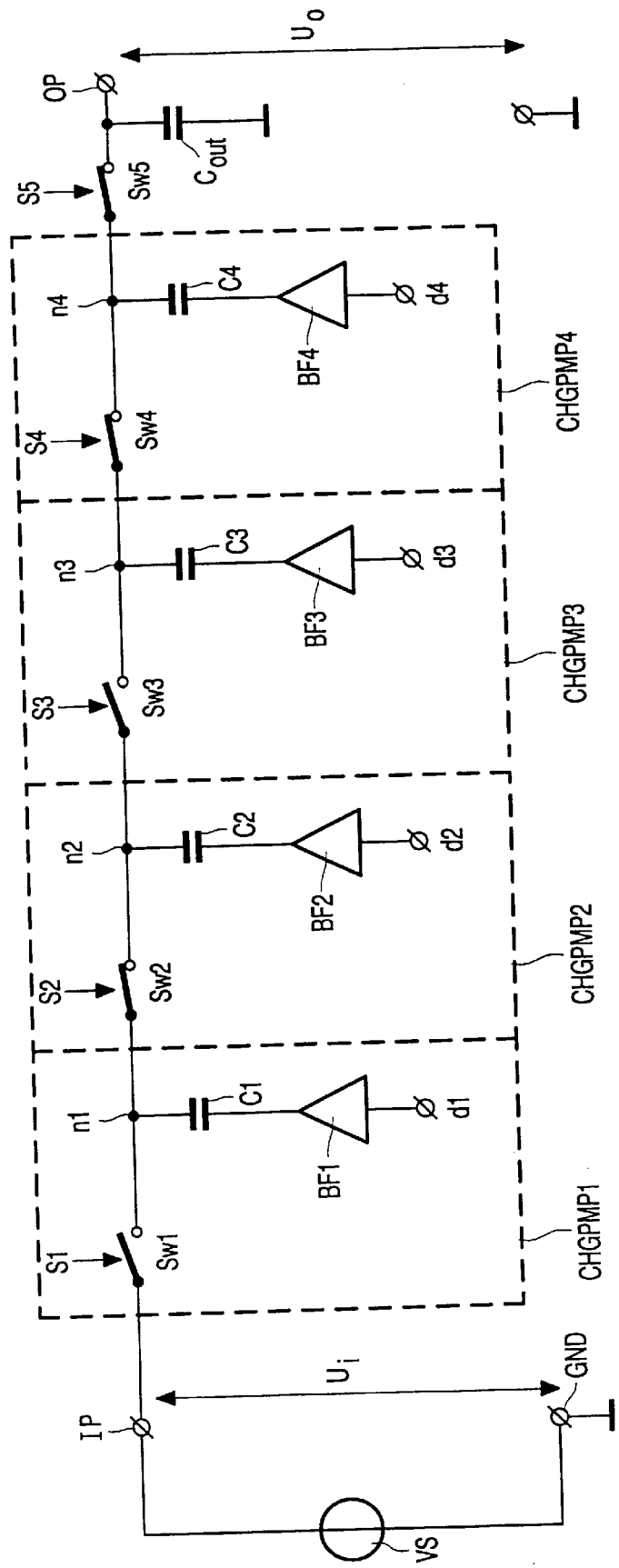
FIG. 2 shows a variant of the cascaded voltage multipliers in accordance with FIG. 1.
Figure 3:
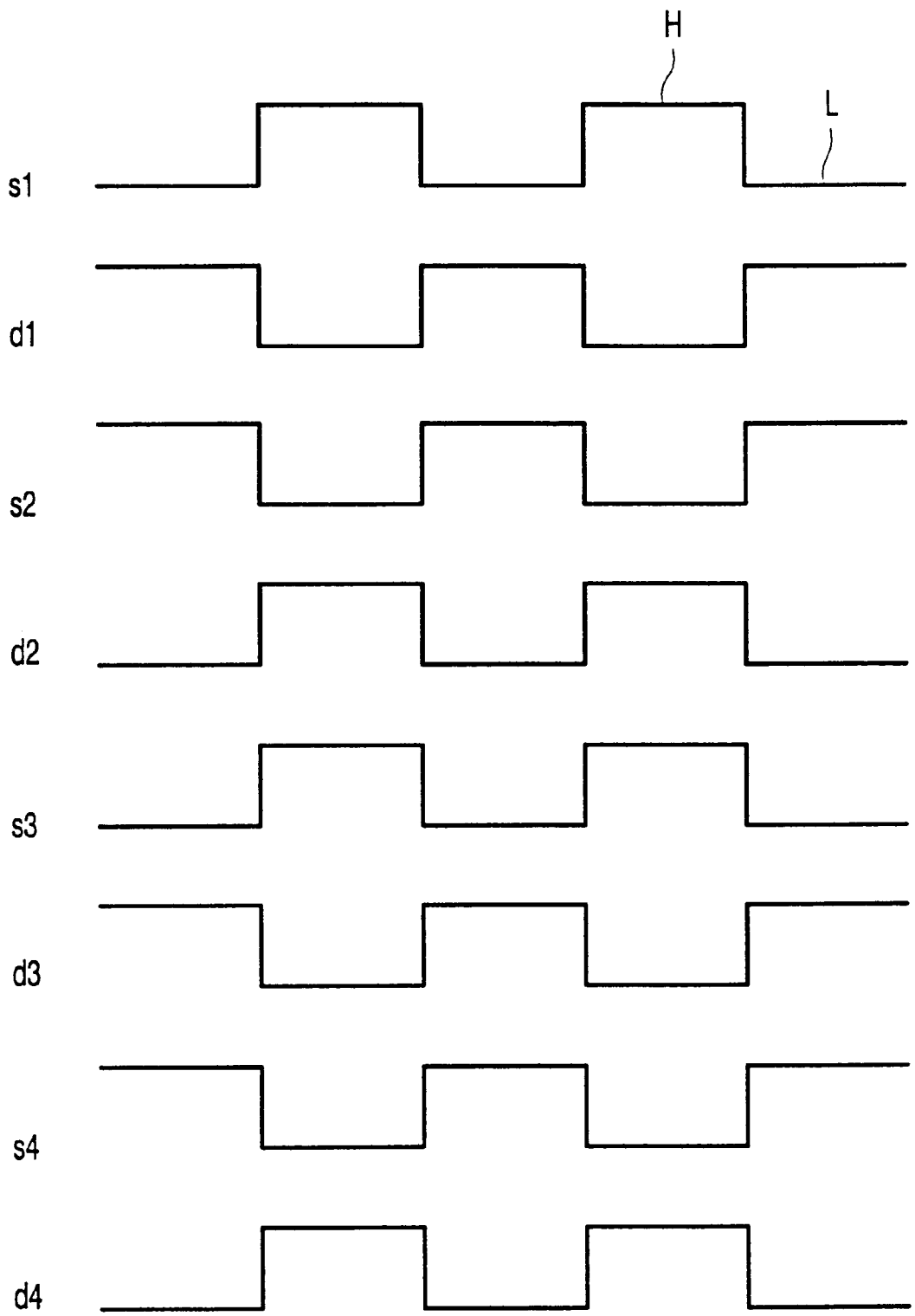
FIGS. 3–5 are waveform diagrams for a better understanding of the invention.
Figure 4:
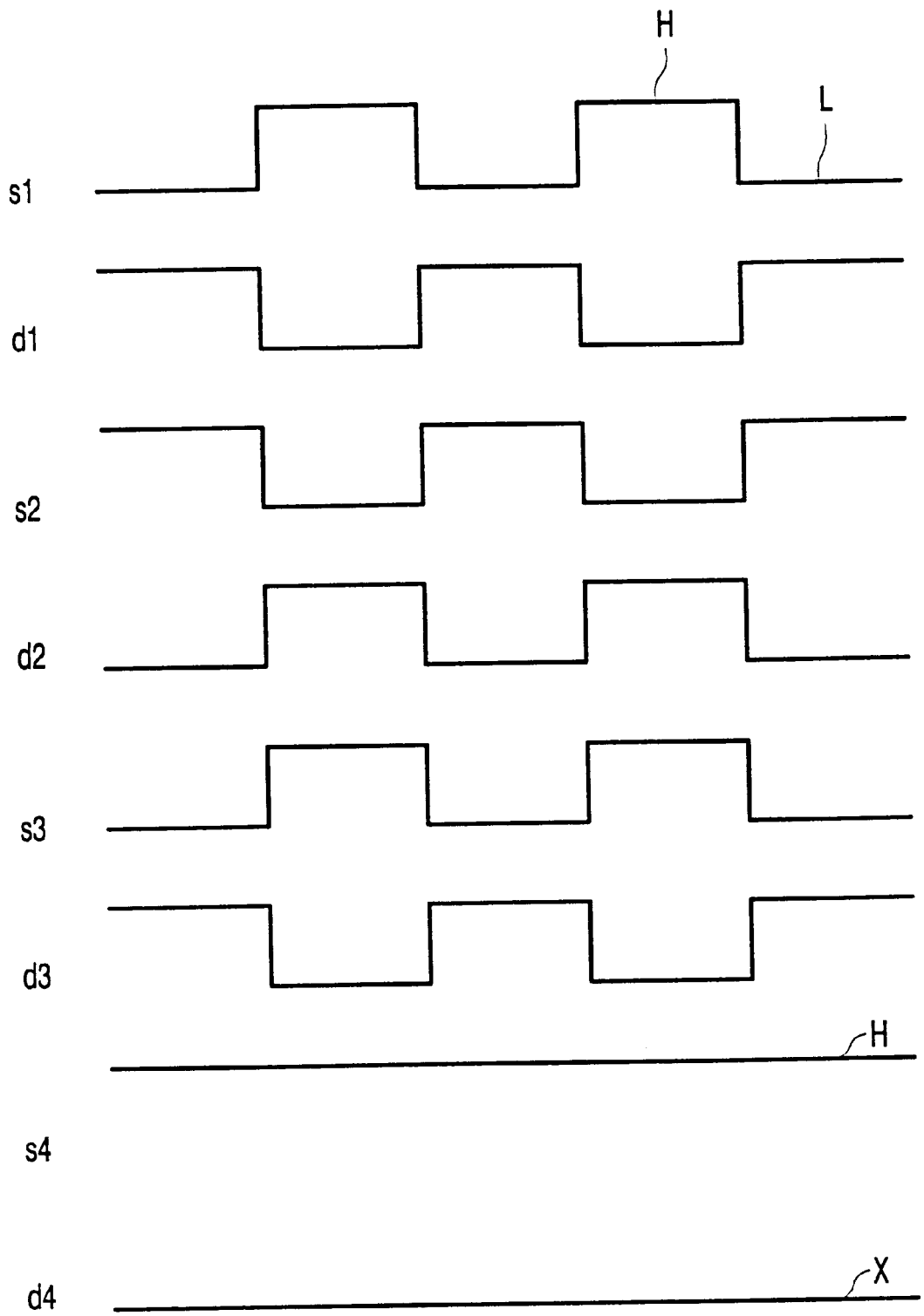

FIG. 2 shows a variant of the cascaded voltage multipliers VM1–VMN in accordance with FIG. 1. By way of example, the number N of the voltage multipliers VM1–VMN is chosen to be four. The first to the fourth voltage multiplier VM1–VM4 are formed by a first to a fourth charge pump CHGPMP1–CHGPMP4. The first charge pump CHGPMP1 comprises a first switch Sw1 connected between the input IP of the voltage converter and a first node n1. The first switch Sw1 is controlled by the clock input signal s1 (see FIGS. 3–5), i.e. the first switch Sw1 is closed when the clock input signal s1 is logic high (H) and is opened when the clock input signal s1 is logic low (L). The first charge pump CHGPMP1 further comprises a first capacitor C1 and a first buffer BF1 having an input for receiving the clock input signal d1, and an output for delivering a buffered version of the clock input signal d1. The first capacitor C1 is connected between the output of the first buffer BF1 and the first node n1. The second to the fourth charge pump CHGPMP2–CHGPMP4 are similar to the first charge pump CHGPMP1. If the pairs of clock input signals s1, d1–s4, d4 are as shown in FIG. 3, all four charge pumps CHGPMP1–CHGPMP4 are active. As mentioned previously, it can be more appropriate when not all charge pumps CHGPMP1–CHGPMP4 are active. If for example, only three of the charge pumps CHGPMP1–CHGPMP4 should be active, it is possible (for example) to generate the pair of clock input signals s4, d4 as shown in FIG. 4. The clock input signal d4 is a so called "don't care" signal, i.e. its value is only relevant in the sense that it must be constant in time. The clock input signal s4 is logic high (H) and thus the fourth switch s4 is closed. As a result, the fourth charge pump CHGPMP4 is non-active. Of course, it is also possible to deactivate another charge pump or several charge pumps CHGPMP1–CHGPMP4 by applying the appropriate pairs of clock input signals s1, d1–s4, d4. For instance, instead of bypassing the fourth charge pumps CHGPMP4 it is possible to bypass the first charge pump CHGPMP1. By doing so a voltage loss over the fourth stage (caused by the resistance of the fourth closed switch SW4) is avoided. This has the advantageous effect that, when applied in an integrated circuit, a voltage inside the integrated circuit will never exceed the output voltage $U_0$. It is even possible to deactivate all charge pumps CHGPMP1–CHGPMP4. In that case the output voltage $U_0$ is equal to the input voltage $U_i$.

Figure 5:
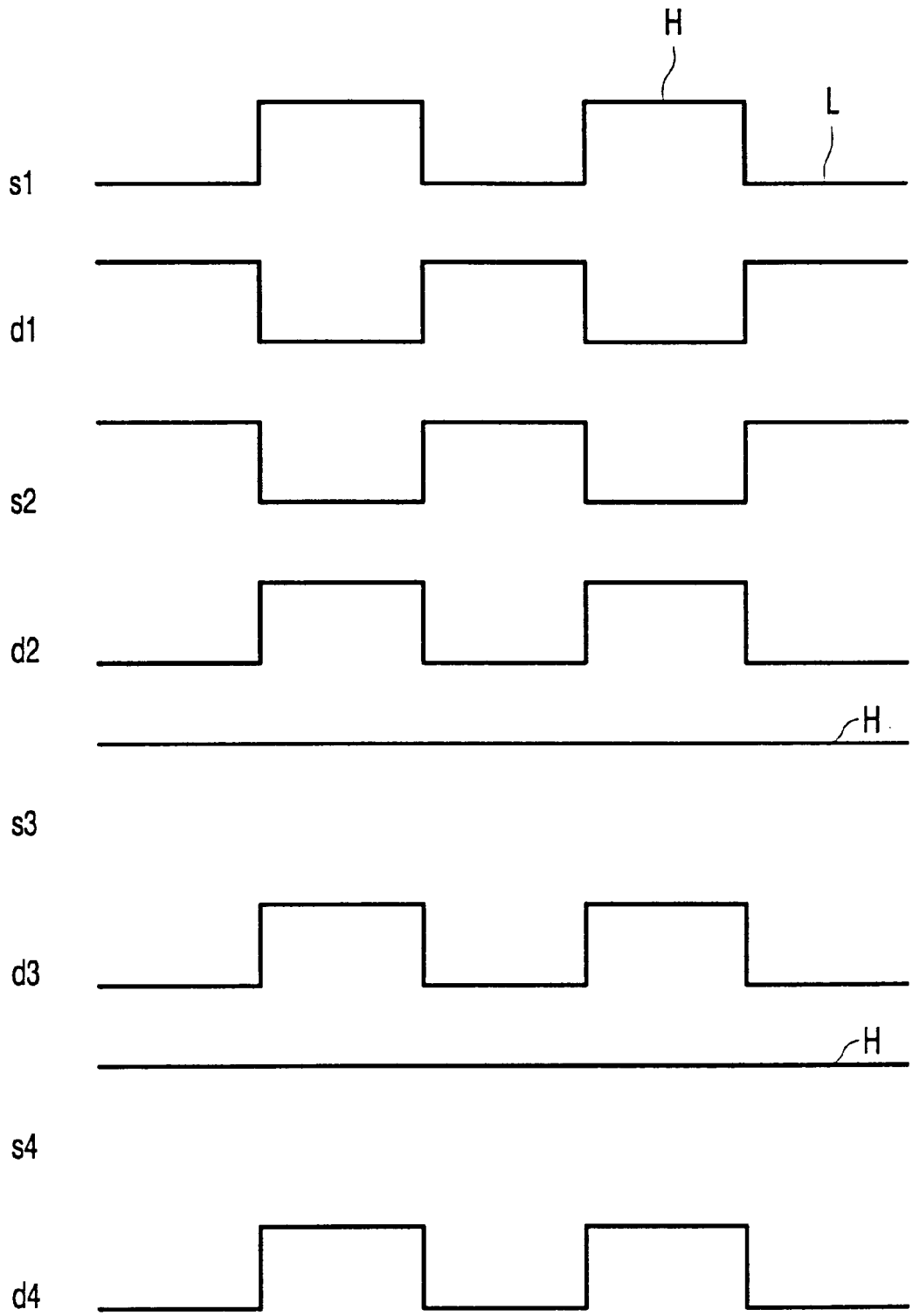

Instead of deactivating charge pumps it is also possible to arrange for a shunting of two or more charge pumps. It is now assumed that the pairs of clock input signals s1, d1–s4, d4 are as shown in FIG. 5. Since the clock input signals s3–s4 are logic high (H) both the third and the fourth switch Sw3,Sw4 are closed. Note that the clock input signals d2–d4 are in phase. Thus, the second, the third and the fourth charge pumps CHGPMP2–CHGPMP4 are arranged in parallel. An advantage of charge pumps instead of deactivating charge pumps is that the output impedance of the voltage converter is reduced.

It is to be noticed that a fifth switch Sw5 is arranged in series between the node n4 and the output terminal OP.

Further an output capacitor $C_{out}$ is connected between the output terminal OP and the ground terminal GND. The purpose of the output capacitor $C_{out}$ it to reduce the ripple on the output voltage $U_0$. The fifth switch Sw5 is controlled by a clock input signal s5 in a manner that a charge transfer from the output capacitor C towards the fourth charge pump CHGPMP4 is avoided.

What is claimed is:

1. A voltage converter, for converting an input voltage ($U_i$) to an output voltage ($U_0$), comprising a plurality of cascaded voltage multipliers (VM1–VMN) having clock inputs, and a control circuit (CNTRLG) for supplying clock signals to the clock inputs, for controlling the voltage multipliers (VM1–VMN), characterized in that the control circuit (CNTRLG) comprises means (SL) for activating selected ones from the plurality of the voltage multipliers (VM1–VMN) as a function of the difference between said output voltage and said input voltage.

2. A voltage converter as claimed in claim 1, characterized in that at least one of the voltage multipliers (VM1–VMN) is formed by a charge pump (CHGPMP1–CHGPMPN).

* * * * *